United States Patent [19]

MacKay et al.

[11] 4,016,836
[45] Apr. 12, 1977

[54] HYDRIDE FUEL SYSTEM

[75] Inventors: Donald B. MacKay, Spanish Fork; Brian C. Nielson; Dale L. Henriksen, both of Orem; Roger Evan Billings, Provo; Harold M. Simons, Orem; Paul P. Hindmarsh, Provo, all of Utah

[73] Assignee: Billings Energy Research Corporation, Provo, Utah

[22] Filed: Sept. 8, 1975

[21] Appl. No.: 611,229

[52] U.S. Cl. .................................. 123/3
[51] Int. Cl.² ............................. F02B 43/00
[58] Field of Search .... 123/1 A, 3, 119 E, DIG. 12; 23/281; 48/61; 423/648

[56] References Cited

UNITED STATES PATENTS

| | | | |
|---|---|---|---|
| 3,291,572 | 12/1966 | Fatica | 23/281 |
| 3,313,598 | 4/1967 | Gluckstein | 423/648 |
| 3,323,873 | 6/1967 | Horn et al. | 23/281 |
| 3,648,668 | 3/1972 | Pacheco | 123/3 |
| 3,676,071 | 7/1972 | Speed | 423/648 |
| 3,709,203 | 1/1973 | Cettin et al. | 123/3 X |
| 3,717,129 | 2/1973 | Fox | 123/1 A |
| 3,734,863 | 5/1973 | Beckert et al. | 423/648 X |

*Primary Examiner*—Charles J. Myhre
*Assistant Examiner*—William C. Anderson
*Attorney, Agent, or Firm*—Criddle, Thorpe & Western

[57] ABSTRACT

A hydride fuel system is disclosed for use with a motor vehicle or other apparatus having a combustion unit and a mixing device for mixing hydrogen gas with air for introduction into the combustion unit. The system includes a hydride storage tank having a housing and a plurality of containers disposed in the housing for holding hydride material. The containers are spaced apart to enable the flow thereabout of fluid introduced into the housing of the hydride storage tank. Either exhaust gases or combustion unit cooling fluid is delivered into the hydride storage tank housing to heat the hydride material in the containers and cause the material to release hydrogen gas which is then conveyed to the mixing device. The pressure of the hydrogen gas in the containers is monitored and the amount of exhaust gases or cooling fluid delivered to the hydride storage tank is controlled accordingly. Thus, if the pressure exceeds some predetermined level, then the delivery of exhaust gases or cooling fluid to the hydride tank is inhibited. Apparatus is also provided for introducing a hydride coolant into the hydride storage tank to circulate about the containers and thereby cool the hydride material. Hydrogen gas is introduced into the containers during the cooling operation and the hydride material is thereby caused to absorb hydrogen gas for future release and delivery to the engine.

31 Claims, 5 Drawing Figures

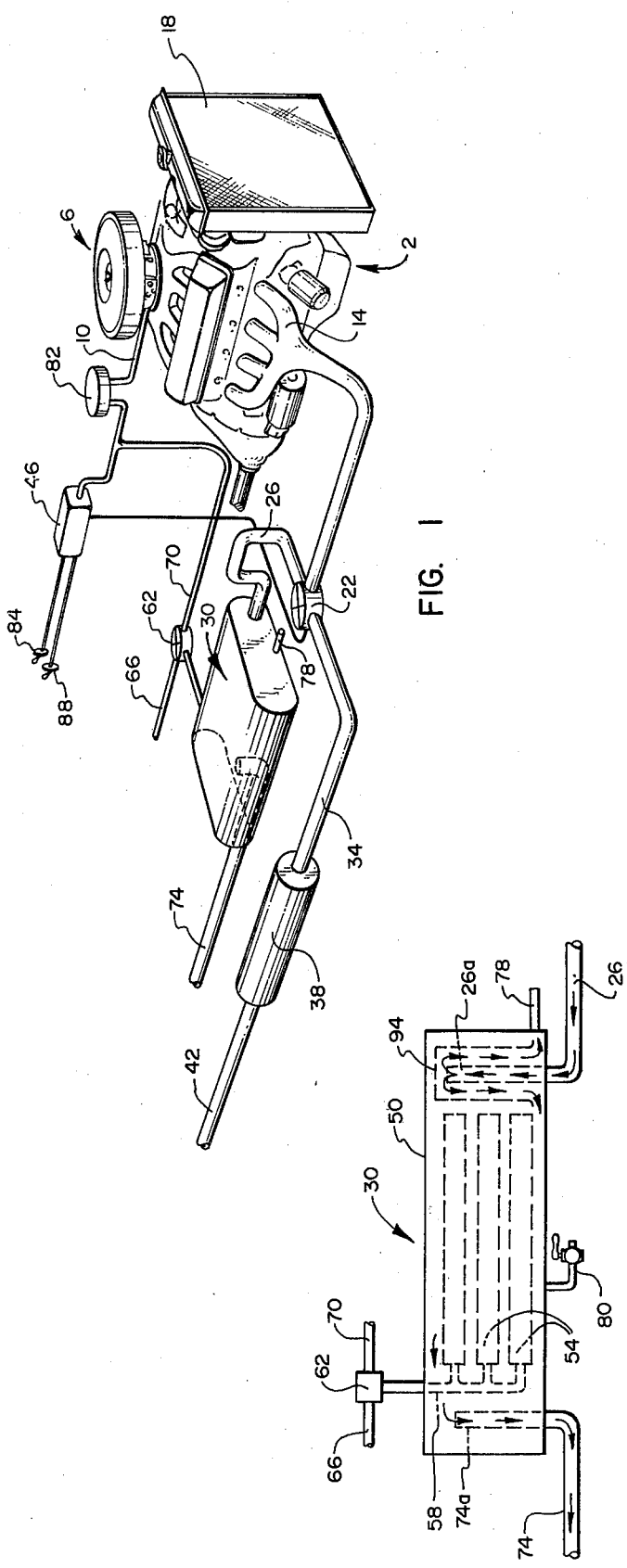
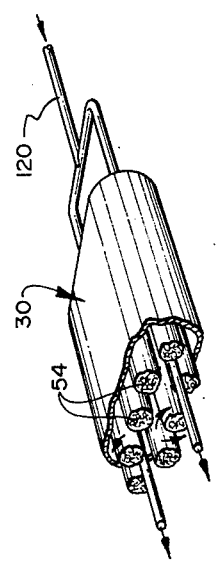
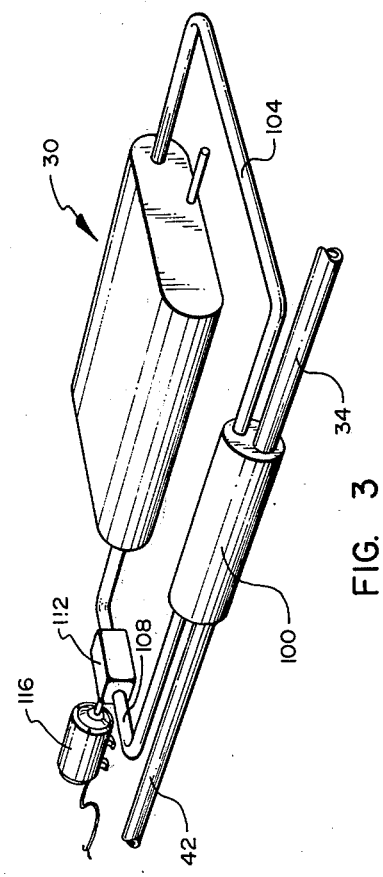

HYDRIDE FUEL SYSTEM

BACKGROUND OF THE INVENTION

This invention relates to a method and system for powering combustion apparatus utilizing hydrides.

As a result of recent shortages in hydrocarbon fuels and the recognition that the supply of such fuels will ultimately be exhausted, there has been an increased interest in finding and developing alternative fuels. One alternative fuel whose potential has long been recognized but, as yet, has not been realized is hydrogen. The attractiveness of hydrogen as a fuel lies in the fact that it is one of the most abundant of all elements, that conventional internal combustion engines can be readily adapted to operate on hydrogen and in such operation, unlike gasoline, a large percentage of the hydrogen is converted to power the engines, and that the burning of hydrogen in such engines can be made to be relatively pollution free. See, for example, copending application, Ser. No. 554,533, filed Mar. 3, 1975. Of course, the potential of hydrogen as a fuel is not limited to internal combustion engines but also extends to industrial use, use in fuel cells and in home and mobile home heaters, and to any situation where natural gas, propane gas, etc., is presently used.

One of the problems which has thus far prevented the widespread use of hydrogen as a fuel has been the difficulty in efficiently and safely storing the hydrogen. Storing hydrogen as a liquid is costly since it requires considerable energy to liquify the hydrogen, and transfer of the liquid from one container to another results in a loss to the atmosphere of much of the hydrogen. Also, containers for the liquid hydrogen must be extremely well insulated to reduce the loss of hydrogen due to vaporization or boiling. Storing hydrogen as a gas requires extremely heavy and bulky containers and is impractical for most presently contemplated consumer uses.

The use of hydride material (hereinafter defined to mean any metals, metal compounds or other materials capable of absorbing and holding hydrogen) appears to be an attractive approach to the storage of hydrogen for consumer purposes. Exemplary hydride material includes iron titanium, misch-metal tetranickel, and columbium. Storage of hydrogen in the hydride material (sometimes referred to as hydriding the material) typically involves lowering the temperature of the hydride material and then applying hydrogen gas under pressure to the material. After the hydride material absorbs the hydrogen, the material is sealed in a container under pressure to maintain the material in the hydrided state until the hydrogen is needed at a subsequent time. Recovery or withdrawal of the hydrogen involves a process substantially opposite that used for storing the hydrogen, i.e., heating the hydride material and releasing some of the pressure of the container in which the hydride material is maintained.

The use of hydride material for storage of hydrogen would appear to be especially attractive for motor vehicles since weight and space conservation are important considerations in motor vehicle design. A motor vehicle fuel system utilizing hydride material would be even more attractive if conventional motor vehicle combustion engines and the accessory systems therefor can be readily adapted for use with the hydride material.

SUMMARY OF THE INVENTION

It is an object of the present invention to provide a hydride fuel system for use with conventional motor vehicles and other apparatus which employ combustion units.

It is also an object of the present invention to provide a hydride fuel system which utilizes conventional combustion unit by-products for implementing operation of the system.

The above and other objects of the present invention are realized in a specific illustrative embodiment of a hydride fuel system for supplying hydrogen gas to a combustion unit having a mixing device adapted to mix hydrogen gas with air for introduction into the combustion unit. The embodiment includes a storage tank having a housing for receiving heat exchange media, and at least one container disposed in the housing for holding hydride material and positioned to enable circulation about the container of heat exchange medium. Heat exchange medium in the form of coolant or exhaust gases from the combustion unit is delivered into the storage tank housing to heat hydride material held in the container and thereby cause the hydride material to release hydrogen gas. The hydrogen gas is then delivered to the mixing device to power the combustion unit. Pressure of hydrogen gas in the container is controlled by controlling the flow of heat exchange medium to the storage tank to thereby control the heating of the hydride material and thus the release of hydrogen gas.

In accordance with one embodiment of the invention, an inlet is provided in the storage tank to allow introduction into the tank housing of a hydride coolant for cooling hydride material in the container so that the material may absorb hydrogen to which the material is exposed. An outlet is provided in the storage tank to enable discharge of heat exchange medium and hydride coolant from the tank.

BRIEF DESCRIPTION OF THE DRAWINGS

The above and other objects, features and advantages of the present invention can best be understood from the following detailed description presented in connection with the accompanying drawings in which:

FIG. 1 shows one illustrative embodiment of a hydride fuel system made in accordance with the principles of the present invention for use with an internal combustion engine;

FIG. 2 shows a side elevational view of an embodiment of a hydride storage tank suitable for use in the hydride fuel system of FIG. 1;

FIG. 3 shows an alternative embodiment of a hydride fuel system made in accordance with the principles of the present invention; and FIG. 4 shows a partially cut away view of still another embodiment of a hydride system made in accordance with the principles of the present invention.

DETAILED DESCRIPTION

Figure 5:
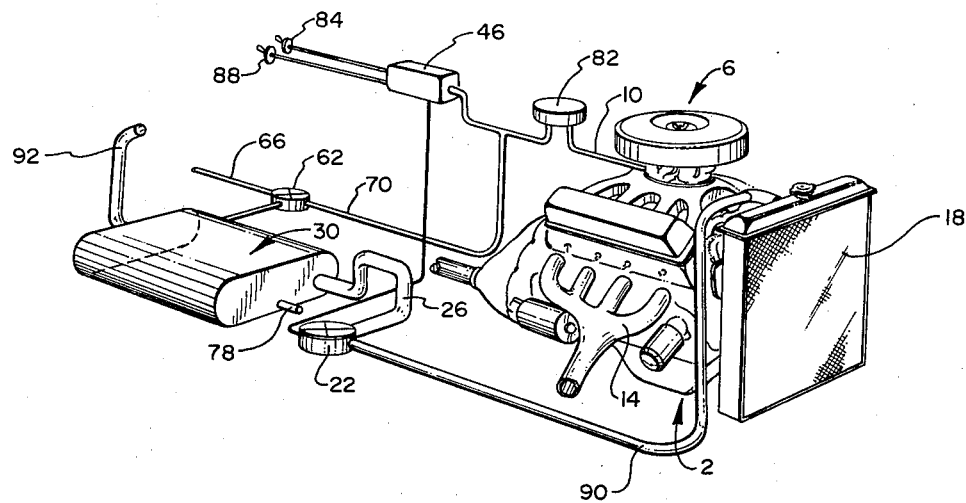
FIG. 5 shows a further embodiment of a hydride system made in accordance with the principles of the present invention.

The hydride fuel system and method of the present invention can be utilized with a variety of systems and apparatus which employ combustion units such as combustion engine powered electrical generators, fuel cells, internal combustion engine powered motor vehicles, etc. For purposes of illustrating the invention, however, the invention will be described as it might be utilized with a motor vehicle powered by an internal combustion engine.

In FIG. 1, there is shown a conventional internal combustion engine 2 used to power motor vehicles. Included on the engine is a carburetor 6 adapted to receive hydrogen gas through a fuel line 10 and to mix the hydrogen gas with air for introduction into the engine. Exemplary carburetors suitable for use with the engine 2 are disclosed in copending patent application, Ser. No. 554,533. Of course, carburetors capable of mixing hydrogen gas and air for use with standard internal combustion engines are well known. Also included with the engine 2 is an exhaust manifold 14 for receiving and carrying away exhaust gases from the combustion chambers of the engine. A radiator 18 is mounted in standard fashion near the front of the engine 2 for cooling an engine coolant.

The exhaust manifold 14 is coupled by way of a bi-directional valve 22 to a pipe 26 leading to a hydride storage tank 30, and to an exhaust pipe 34 leading to a muffler 38 and another section of pipe 42. The valve 22 is adapted to direct exhaust gases from the manifold 14 either through the pipe 26 to the hydride storage tank 30 or to the pipe 34 for discharge into the atmosphere, or to both. In other words, as will be discussed momentarily, the valve 22 may be adapted to direct all the exhaust gases either through pipe 26 to the hydride storage tank 30 or through pipe 34, muffler 38 into pipe 42 to the atmosphere. Alternatively, the valve 22 may be adapted to direct a determinable portion of the exhaust gases to pipe 26 and another portion to pipe 34. The valve 22 may be of any standard type valve capable of receiving fluid from one line and directing the fluid to either of two outlet lines or to both outlet lines in given proportions. Advantageously, the valve 22 is a solenoid valve controlled by a valve control unit 46 to be discussed later.

The hydride storage tank 30 is adapted to hold hydride material therein and to enable the circulation of a heat exchange medium in proximity with the hydride material to heat the material and cause it to release hydrogen gas. Exemplary hydride storage tank configurations are disclosed in copending patent application, Ser. No. 570,268. FIG. 2 similarly shows an exemplary structure for the hydride storage tank 30 of FIG. 1, this structure including a housing 50 in which are disposed a plurality of containers 54 (shown by dotted line). Containers 54 are for holding hydride material and are spaced apart within the housing 50 to facilitate the flow thereabout of fluid heat exchange medium such as exhaust gases, engine coolant, etc. Coupled to the ends of the containers 54 is a manifold 58 for introducing hydrogen gas into the containers and for receiving hydrogen gas therefrom. The manifold 58 is coupled to a valve 62 for enabling communication between the manifold and either inlet pipe 66 or engine fuel line section 70.

Heat exchange medium is introduced into the housing 50 of the hydride storage tank by way of the pipe 26 coupled either into the bottom of the housing 50 (as shown in FIG. 2), the end of the housing 50 (as shown in FIG. 1), or into the housing at any other suitable place. Heat exchange medium is discharged from the housing 50 by way of a pipe 74 coupled to the housing at the end or side opposite that in which the pipe 26 is coupled. The specific manner of coupling pipes 26 and 74 into the hydride storage tank 30, as shown in FIG. 2, will be discussed later.

Also included in the hydride storage tank 30 is an inlet 78 through which a hydride coolant is introduced to circulate about the containers 54 and thereby facilitate cooling of the hydride material to enable absorption of hydrogen introduced through inlet pipe 66 to manifold 58. Such hydride coolant may, for example, be cold water. The hydride coolant is discharged through pipe 74 and also through a tap 80 located in the bottom wall of the housing 50.

Referring again to FIG. 1, the fuel line section 70 is coupled both to the valve control unit 46 and to a pressure regulator 82 the latter of which, in turn, is coupled to fuel line 10. Hydrogen gas from the containers inside the housing of the hydride storage tank 30 flows through the valve 62, fuel line section 70 and regulator 82 to the carburetor 6 of the engine. The pressure regulator 82 maintains a substantially constant pressure in the hydrogen gas leaving the regulator and thus facilitates a smooth flow of the hydrogen gas. Such pressure may, for example, be from about 20 p.s.i. to 60 p.s.i. for a one-half inch diameter fuel line. Pressure regulators for controlling fluid pressure are well known.

The valve control unit 46 is coupled to the fuel line section 70 for determining the pressure of the hydrogen gas entering the regulator. The valve control unit 46 is also coupled to the valve 22 to control the operation of the valve in accordance with the pressure of the hydrogen gas. For example, the valve control unit 46 may be adapted to cause the valve 22 to direct exhaust gases from the manifold 14 to the pipe 34 and to prevent exhaust gases from entering pipe 26 and flowing to the hydride storage tank 30 when the pressure of the hydrogen gas exceeds some predetermined value. The level selected for causing the valve control unit 46 to carry out this function would be determined by the power demands of the engine, the ability of the hydride storage tank 30 to provide for the transfer of heat from the exhaust gases to the hydride material, and the structural ability of the containers 54 (FIG. 2) to withstand the pressure of the hydrogen gas being released by the hydride material. Of course, when the pressure is within safe limits, then exhaust gases from the manifold 14 can safely be introduced into the hydride storage tank 30 to heat the hydride material and cause release of more hydrogen gas. (The spent exhaust gases are discharged through discharge pipe 74 into the atmosphere). When a sufficient reserve of hydrogen gas has been released to accommodate the operating requirements of the engine 2 and the pressure of the hydrogen gas has built up to the predetermined level, then it is desirable to inhibit further heating of the hydride material by the exhaust gases and therefore the exhaust gases are directed by the valve control unit 46 and valve 22 to the pipe 34, muffler 38 and pipe 42 into the atmosphere.

An alternative arrangement to that disclosed above for the control of the valve 22 is a type of proportional control in which the valve control unit 46 operates the valve 22 to direct a portion of the exhaust gases into pipe 26 and thus into the hydride storage tank 30 and a portion to the pipe 34. The amount of the portion allowed to flow to the hydride storage tank 30 is inversely proportional to the pressure of the hydrogen gas entering the regulator 82. Thus when the pressure increases, the amount of exhaust gas allowed to enter the hydride storage tank 30 would be decreased to reduce the heating of the hydride material and generation of further hydrogen gas. On the other hand, when the hydrogen gas pressure decreased, the valve 22 would be operated to direct more exhaust gases to the hydride storage tank 30 to thereby cause further heating of the hydride material in the containers 54 (FIG. 2) and thus increase the rate of release of hydrogen gas by the hydride material.

The valve control unit 46 may be adapted to either operate manually or automatically. Advantageously, when a switch 84 is operated to a first position, the valve control unit 46 is conditioned to operate the valve 22 in response to pressure determination of the hydrogen gas as already discussed. When the switch 84 is operated to a second position, the valve control unit 46 is conditioned to respond to the position of a second switch 88 which, when placed in a first position, causes the valve control unit 46 to direct gases from the manifold 14 exclusively to pipe 26 and thus to the hydride storage tank 30. Alternatively, when the switch 88 is operated to a second position, the valve control unit 46 is conditioned to operate the valve 22 to direct gases from the exhaust manifold 14 to the pipe 34 only. The switches 84 and 88 would advantageously be positioned on the dashboard of the motor vehicle in which the hydride fuel system and engine are installed. This would enable the operator of the vehicle to select either the automatic or manual mode of operation of the valve control unit 46 by operating switches 84 and 88 located at the fingertips of the vehicle operator.

The valve control unit 46 might illustratively include a pressure sensing element, such as a piezo-electric crystal, located at the inlet of the fuel line section 70 into the unit 46 and therefore subject to pressure of hydrogen gas in the section 70. The pressure sensing element produces a signal which specifies the pressure level of the hydrogen gas. A threshold switch or proportional switch would then respond to this signal by controlling the state of the valve 22.

As indicated above, an important feature of the present invention is the control of pressure of hydrogen gas in the containers 54 to maintain the pressure at a level sufficient to meet the operating requirements of the engine 2, but yet not so high as to damage the containers. This is accomplished in the FIG. 1 embodiment by the valve 22 and valve control unit 46. An alternative arrangement would be to determine by experimentation the sizes of pipe 26 and pipe 34 which would provide a suitable flow of exhaust gases to the hydride tank 30 to maintain the pressure of hydrogen gas in containers 54 within a desired range for the engine in question, and then simply install a hydride fuel system having these size pipes in motor vehicles using such engines. Then, the valve 22 and valve control unit 46 could be dispensed with, but at the expense of the more precise control afforded by including these elements.

A brief description of the operation of the hydride fuel system of FIG. 1 will now be given. Initially, a hydrogen gas source is coupled to inlet pipe 66, and the valve 62 is operated to direct the gas into the containers 54 in the hydride storage tank 30. During introduction of the hydrogen gas into the containers, a hydride coolant is introduced via an inlet 78 to circulate about the containers 54 (FIG. 2) and then out the discharge pipe 74. The hydride coolant cools the hydride material in the containers causing the hydride material to absorb hydrogen to which it is being exposed. When the hydride material has absorbed a sufficient amount of hydrogen, the valve 62 is operated to prevent introduction of anymore hydrogen gas into the containers, the inlet 78 is stopped, and tap 80 (FIG. 2) is opened to allow the discharge of any hydride coolant remaining in the housing of the hydride storage tank 30. With the hydride storage tank 30 charged with hydrogen, the engine 2 is ready to operate.

It should be mentioned at this point that charging the hydride tank 30 with hydrogen could be carried out by simply applying hydrogen gas to the containers 54 without the use of a hydride coolant, but that such charging would typically require considerably more time than if hydride coolant were used.

To start the engine 2, valve 62 is operated to allow hydrogen gas to flow from the manifold 58 to the fuel line section 70 and thus to the pressure regulator 82 and carburetor 6. The engine is started in the same manner as a standard gasoline engine except that a mixture of hydrogen gas and air are introduced into the combustion chambers for combustion. Upon starting the engine 2, of course, exhaust gases flow through the manifold 14 and are directed to the pipe 26 and into the hydride storage tank to cause the hydride material to release hydrogen gas and maintain the pressure of the hydrogen gas at the desired level. As already discussed, if the pressure exceeds some predetermined level, the valve control unit 46 causes the valve 22 to direct the exhaust gases to the pipe 34 for discharge into the atmosphere. In the manner described, the normal by-products of an internal combustion engine are used to release the hydrogen gas which is used to power the engine.

Although the discussion above has been directed to utilization of exhaust gases to heat the hydride material, it should be understood that engine coolant used to cool the engine could similarly be used. Thus referring to FIG. 5, a conduit 90 is coupled into the cooling system of the engine 2 to direct engine coolant to the valve 22 in place of the exhaust gases. Advantageously, the engine coolant would be withdrawn from the engine cooling system after circulation through the engine and before reintroduction of the coolant into the radiator 18, so that the coolant would be at its highest temperature. Then, after the engine coolant circulated in the hydride storage tank 30, it would be returned via a pipe 92 to the radiator 18 for circulation through the radiator and then again through the engine 2. The valve 22 would control the rate of flow of engine coolant to the tank 30. Because, upon initially starting an engine, engine coolant is not at a high temperature, some time would elapse before the engine coolant could function to heat the hydride material to cause the hydride material to release hydrogen gas. However, as long as a sufficient hydrogen gas pressure were maintained in the containers 54 (FIG. 2) from the previous operation of the vehicle, this time lapse should not be a problem.

Referring again to FIG. 1, it is desired that hydride coolant not "back up" into the pipe 26 and thus into the exhaust manifold 14 (or engine cooling system) while the hydride storage tank 30 is being charged with hydrogen. To obviate this possibility, the pipe 26 is formed into a "gooseneck" in which a portion of the pipe is elevated above the hydride storage tank 30 and thus above the highest level to which the hydride coolant could rise in the storage tank 30. An alternative to the gooseneck arrangement is shown in FIG. 2 to include positioning the end 26a of pipe 26 in the hydride storage tank 30 at a level above the position of the end 74a of the discharge pipe 74. Thus, hydride coolant introduced via inlet 78 would flow out the discharge pipe 74 before it reached a level where it could flow into the end 26a of the pipe 26.

In order to facilitate greater circulation of whatever heat exchange medium in introduced into the hydride storage tank 30, a structure 94 in the form of an inverted bucket or beaker is positioned over the end 26a of the pipe 26 to direct heat exchange medium flowing through the pipe 26 downwardly from the end 26a to the bottom of the housing 50 prior to beginning circulation about the containers 54. In other words, the heat exchange medium is effectively introduced into the hydride storage tank 30 near the bottom of the housing 50 to then flow upwardly to the end 74a of the discharge pipe 74. The heat exchange medium thus must flow not only from one end or side of the housing 50 to the other end or side but it also must flow from the bottom of the housing to near the top of the housing. With this configuration, a greater circulation of heat exchange medium about the containers 54 is achieved.

FIG. 3 shows an alternative arrangement for heating the hydride material in the containers 54 in which a type of indirect heating is achieved. In this embodiment, exhaust gases are not applied directly to the hydride storage tank 30 but rather are applied to a heat exchanger 100 to heat another exchange medium which flows through a conduit 104 to the hydride storage tank 30 and then through another conduit 108 back to the heat exchanger 100. A pump 112 is disposed in the conduit 108 to pump the heat exchange medium and cause it to circulate through the conduits 108 and 104. The pump 112 is operated by a motor 116 whose power source is not shown. In operation, exhaust gases flow through the heat exchanger 100 to heat the heat exchange medium which is pumped through the heat exchanger and through conduit 104 into the hydride storage tank 30 where it circulates about the containers 54 (FIG. 2). The heat exchange medium then flows out of the hydride storage tank 30 through the conduit 108 and pump 112 back to the heat exchanger 100 where it is again heated. Advantageously, a control unit similar to the valve control unit 46 of FIG. 1 could be employed to control operation of the motor 116, i.e., to turn off the motor if the pressure of the hydrogen gas in the containers 54 (FIG. 2) exceeded a predetermined level so that circulation of the heat exchange medium through the heat exchanger 100 is terminated and the release of hydrogen gas by the hydride material in the containers is inhibited. With this arrangement, the material from which the containers 54 are constructed need be less resistant to high temperatures since the containers are not subjected directly to the very hot exhaust gases. Thus, the cost of construction and the weight of the hydride storage tank 30 may be reduced.

FIG. 4 shows still another embodiment of a hydride storage tank 30 for use in the hydride fuel system of the present invention. In this embodiment, exhaust gases, or other heat exchange medium, is directed through conduits 120 which extend into and through the housing of the hydride storage tank 30. Another heat exchange medium is maintained within the housing of the hydride storage tank 30 and this medium is heated by exhaust gases flowing through the conduits 120. Natural convection currents created by the heating of the heat exchange medium contained in the housing of the hydride storage tank 30 cause the heat exchange medium to circulate about the containers 54 and thereby heat the hydride material held therein. This, again, is a type of indirect heating which provides some of the advantages of the arrangement of FIG. 3 but does not include the disadvantages of having to provide the heat exchanger 100, pump 112 and motor 116. Of course, valve apparatus may be included in conduits 120 to control the amount of heat exchange medium flowing therethrough in response to a valve control unit such as that described in FIG. 1. Also, the heat exchange medium flowing through conduits 120 could be discharged into the atmosphere (if exhaust gases) or returned to its source (if engine coolant).

It is to be understood that the above-described embodiments are only illustrative of the principles of the present invention. Other embodiments may be described by those skilled in the art without departing from the spirit and scope of the invention, and the appended claims are intended to cover such embodiments.

What is claimed is:

1. A hydride fuel system for supplying hydrogen gas to a combustion unit which includes a mixing unit for mixing hydrogen gas with air for introduction into the combustion unit, and an exhaust manifold for carrying exhaust gases from the combustion unit, said system comprising a hydride storage tank which includes a housing and at least one container disposed in the housing for holding hydride material, said container being disposed to enable the flow thereabout of fluid introduced into the tank, means for delivering exhaust gases from the manifold into the hydride storage tank to thereby heat hydride material in the container and cause the hydride material to release hydrogen gas, an exhaust system for carrying exhaust gases from the manifold into the atmosphere, means for controlling the pressure of the hydrogen gas in said container, means for conveying hydrogen gas from the container to the mixing unit, means for introducing hydrogen gas into the container, and means for discharging exhaust gases from the hydride storage tank.

2. A hydride fuel system as in claim 1 wherein said pressure controlling means includes means coupled into said exhaust system for controlling the flow of exhaust gases to the hydride storage tank to thereby control the amount of hydrogen gas released from the hydride material and thus the pressure of hydrogen gas in the container.

3. A hydride fuel system as in claim 2 wherein said flow controlling means includes valve means for selectively directing exhaust gases either to the hydride storage tank, to the atmosphere, or to both.

4. A hydride fuel system as in claim 3 wherein said hydrogen gas conveying means includes regulator means through which hydrogen gas flows for maintaining hydrogen gas leaving the regulator means at a substantially constant pressure.

5. A hydride fuel system as in claim 4 further comprising valve control means coupled to said hydrogen gas conveying means for operating said valve means to direct exhaust gases to said hydride storage tank when the pressure of hydrogen gas entering the regulator means through the conveying means is below some predetermined level.

6. A hydride fuel system as in claim 4 further comprising valve control means coupled to said hydrogen gas conveying means for operating said valve means to direct a portion of the exhaust gases to said hydride tank, wherein such portion is inversely proportional to the pressure of hydrogen gas entering the regulator means through the conveying means.

7. A hydride fuel system as in claim 3 further comprising pressure detection means for determining the pressure of the hydrogen gas in said container and for operating said valve means to direct exhaust gases to said hydride storage tank when the pressure of hydrogen gas in the container is below some predetermined level.

8. A hydride fuel system as in claim 2 further comprising inlet means in the housing of the hydride storage tank through which coolant may be introduced into the tank to thereby cool hydride material in the container and cause the hydride material to absorb hydrogen to which the hydride material is exposed.

9. A hydride fuel system as in claim 8 wherein at least a portion of said exhaust gas delivering means through which exhaust gases travel is elevated above the level to which coolant in the hydride storage tank may rise.

10. A hydride fuel system as in claim 9 wherein said exhaust gas delivering means is adapted to deliver exhaust gases into said hydride storage tank near the bottom and one side thereof, wherein said discharging means is adapted to receive exhaust gases and coolant from the hydride storage tank near the top and an opposite side thereof, and wherein at least a portion of said container is disposed between said exhaust gas delivering means and said discharging means.

11. A hydride fuel system as in claim 10 wherein said hydride storage tank includes tap means located in a bottom wall of the tank through which coolant may be withdrawn from the tank.

12. A hydride fuel system for supplying hydrogen gas to a combustion unit which includes a mixing unit for mixing hydrogen gas with air for introduction into the combustion unit, said system comprising
  a storage tank which includes a housing for holding a first heat exchange medium, and a plurality of containers disposed in the housing for holding hydride material, said containers being spaced apart to enable the flow thereabout of heat exchange medium contained in the housing,
  means extending through said storage tank among said containers for carrying a second heat exchange medium through the storage tank to thereby heat the first heat exchange medium, and thus cause the first heat exchange medium to heat hydride material in the containers and cause the hydride material to release hydrogen gas,
  means coupled into said second heat exchange medium carrying means for determining the flow of the second heat exchange medium through the carrying means,
  means for conveying hydrogen gas from the containers to the mixing unit, and
  means for introducing hydrogen gas into the containers.

13. A hydride fuel system as in claim 12 further comprising
  inlet means in the housing of the storage tank through which a third heat exchange medium may be introduced into the tank to cool the hydride material in the containers and thereby cause the hydride material to absorb hydrogen to which the hydride material is exposed, and
  outlet means in said housing for discharging heat exchange medium from the storage tank, 14. A hydride fuel system as in claim 13 wherein said hydrogen gas conveying means includes a pressure regulator through which the hydrogen gas flows to the mixing unit for maintaining the hydrogen gas leaving the regulator at a substantially constant pressure.

15. A hydride fuel system as in claim 14 wherein said determining means is a valve.

16. A hydride fuel system as in claim 15 further comprising pressure determining means coupled to said containers for determining the pressure of hydrogen gas in the containers and for operating said valve to direct a portion of the second heat exchange medium through said second heat exchange medium carrying means, wherein such portion is inversely proportional to the pressure of the hydrogen gas detected by the pressure determining means.

17. A hydride fuel system as in claim 13 wherein the combustion unit includes an exhaust manifold for carrying exhaust gases from the combustion unit, and wherein said second heat exchange medium carrying means is coupled to the manifold for carrying exhaust gases from the manifold through the storage tank.

18. A hydride fuel system as in claim 13 wherein the combustion unit includes a cooling system for circulating through the combustion unit, and wherein said second heat exchange medium carrying means is coupled into the cooling system for carrying coolant from the cooling system through the storage tank.

19. A hydride fuel system for supplying hydrogen gas to a combustion unit having a mixture unit for mixing hydrogen gas with air for introduction into the combustion unit, and an exhaust system for carrying exhaust gases from the combustion unit, said hydride fuel system comprising
  a hydride storage tank which includes a housing and a plurality of containers disposed in the housing for holding hydride material, said containers being spaced apart to enable the flow thereabout of fluid introduced into the tank,
  heat exchanger means coupled into the exhaust system for heating a heat exchange medium,
  means for carrying heat exhaust medium from the heat exchanger means to the hydride storage tank and from the hydride storage tank back to the heat exchanger means,
  pump means coupled into said heat exchange medium carrying means for causing the heat exchange medium to circulate through the carrying means,
  means for conveying hydrogen gas from the containers to the mixing unit, and
  means for introducing hydrogen gas into the containers.

20. A hydride fuel system as in claim 19 further comprising inlet means in the housing of the hydride storage tank through which coolant may be introduced into the tank to thereby cool the hydride material in the containers and cause the hydride material to absorb hydrogen introduced into the containers.

21. A hydride fuel system as in claim 20 further comprising a regulator means disposed in said hydrogen gas conveying means for maintaining the pressure of the hydrogen gas entering the mixing unit at a substantially constant pressure.

22. A hydride fuel system as in claim 21 further comprising pressure determining means coupled to said containers for determining the pressure of hydrogen gas in the containers and for inhibiting the operation of said pump means when the pressure of hydrogen gas in said containers exceeds some predetermined level.

23. A hydride fuel system for supplying hydrogen gas to a combustion unit having a mixing unit for mixing hydrogen gas with air for introduction into the combustion unit, and a cooling system for circulating a first coolant through the combustion unit, said system comprising a hydride storage tank which includes a housing for holding a hydride material, said container being disposed to enable the flow thereabout of fluid introduced into the tank, means for delivering the coolant from the cooling system to the hydride storage tank and from the storage tank back to the cooling system, to thereby heat hydride material in the container and cause the hydride material to release hydrogen gas, means for conveying hydrogen gas from the container to the mixing unit, means for introducing hydrogen gas into the container.

24. A hydride fuel system as in claim 23 further comprising inlet means in the housing of the hydride storage tank through which a hydride coolant may be introduced into the tank to thereby cool hydride material in the container and cause the hydride material to absorb hydrogen to which the hydride material is exposed.

25. A hydride system as in claim 24 wherein said hydrogen gas conveying means includes regulator means through which hydrogen gas flows for maintaining hydrogen gas leaving the regulator at a substantially constant pressure.

26. A hydride system as in claim 25 further comprising valve means coupled into said first coolant delivering means for controlling the rate of flow of the first coolant to the hydride storage tank, and valve control means coupled to said hydrogen gas conveying means and to said valve means for causing the valve means to reduce the rate of flow of the first coolant to the hydride storage tank as the pressure of hydrogen gas entering the regulator means through the conveying means increases.

27. A method of supplying hydrogen gas to a combustion unit which includes a mixing unit for mixing hydrogen gas with air for introduction into the combustion unit, said method including
  a. conveying to the mixing unit hydrogen gas from at least one container disposed in a hydride storage tank, said container adapted to hold hydride material and said hydride storage tank having a housing in which the container is disposed so as to allow fluid to flow about the container,
  b. introducing hydrogen gas into the container,
  c. introducing exhaust gases from the combustion unit into the hydride storage tank to circulate about the container and thereby heat the hydride material held in the container to cause the material to release hydrogen gas,
  d. controlling the pressure of the hydrogen gas in the container to maintain the pressure below a predetermined level, and
  e. discharging exhaust gases from the hydride storage tank.

28. A method as in claim 27 wherein step (d) comprises inhibiting step (c) when the pressure of the hydrogen gas in the container exceeds a predetermined level.

29. A method as in claim 27 further including
  f. introducing a heat exchange medium into the hydride storage tank to circulate about the container and thereby cool hydride material in the container to cause the hydride material to absorb hydrogen introduced into the container, and
  g. withdrawing the heat exchange medium from the hydride storage tank.

30. A method as in claim 29 wherein step (c) comprises introducing exhaust gases from the combustion unit into the hydride storage tank from an elevation above the level to which the heat exchange medium may rise in the tank.

31. A method as in claim 30 wherein steps (e) and (g) comprise withdrawing exhaust gases and heat exchange medium from the hydride storage tank near the top and one side thereof, and wherein step (c) further comprises introducing exhaust gases into the tank near the bottom and an opposite side thereof.

* * * * *